United States Patent Office 3,254,075
Patented May 31, 1966

---

3,254,075
1-(2-HYDROXYETHYL AND 2-HALOETHYL-3-(5-NITROFURFURYLIDENEAMINO)-2-IMIDAZOLIDINONES
Frank Frederick Ebetino, Norwich, N.Y., assignor to The Norwich Pharmacal Company, Norwich, N.Y., a corporation of New York
No Drawing. Filed Aug. 28, 1963, Ser. No. 305,214
3 Claims. (Cl. 260—240)

This invention relates to new chemical compounds. More particularly this invention relates to new chemical compounds distinguished by a low order of toxicity and a high order of chemotherapeutic activity upon oral administration as well as being inimical to a wide range of parasites upon contact with them. The compounds of this invention may be described as 1-substituted-3-(5-nitrofurfurylideneamino)-2-imidazolidinones of the formula:

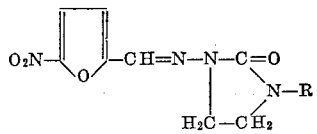

wherein R is a hydroxyethyl or haloethyl group.

These compounds possess a broad antibacterial spectrum, inhibiting the growth of organisms such as *Staphylococcus aureus*, *Escherichia coli*, *Streptococcus agalactiae*, *Erysipelothrix insidiosa* and *Aerobacter aerogenes* in very small amounts of the order of from 0.31 to 1.5 mg. percent. They are thus adapted to be employed as the toxic constituent of compositions designed to effect the eradication of bacterial growth. They may conveniently be composed for such purpose in the form of dusts, sprays, ointments and the like.

In addition, these compounds are effective systemic chemotherapeutic agents. Upon oral administration to mice lethally infected with *Staphylococcus aureus*, protection against death is secured in 50% of the animals by a dose of from about 33 to 118 mg./kg. When fed to chickens infected with *Eimeria tenella*, mortality and morbidity is curtailed. In this application, a poultry feed containing about 0.022% by weight of these compounds is highly effective.

The compounds of this invention are further distinguished by their resistance to metabolic destruction when fed to animals. When administered to rats perorally at a dose of 10 mg./kg. from 16 to 35% of that dose is excreated in the urine, rendering it antibacterial. Such a property makes these compounds valuable agents in the treatment of urinary tract infections.

The methods which may be contemplated for the production of these new compounds comprise bringing together 5-nitrofurfural or a derivative thereof, such as the diacetate or oxime, which is readily hydrolyzable thereto and the appropriately 1-substituted-3-amino-2-imidazolidinone in the presence of a suitable solvent such as the alkanols. The product of the reaction separates as a solid which is recovered in conventional fashion and may be recrystallized, if desired, from suitable solvents such as alkanols, dimethylformamide, dimethylsulfoxide, acetonitrile and mixtures thereof.

The method which is currently preferred consists in reacting 2-(2-aminoethylamino)ethanol with urea under the influence of heat to obtain 1-(2-hydroxyethyl)imidazolidinone; nitrosation of it with a suitable agent such as sodium nitrite in the presence of acid, followed by hydrogenation using a metal such as zinc in the presence of acid to produce the amino compound which is contacted with 5-nitrofurfural to yield the desired product 1-(2-hydroxyethyl)-3-(5-nitrofurfurylideneamino)-2-imidazolidinone. This product will serve to prepare 1-(2-haloethyl)-3-(5-nitrofurfurylideneamino)-2-imidazolidinone by reaction with a halogenating agent such as thionyl chloride.

The compounds of this invention may be readily compounded and formulated in accordance with pharmaceutical practice using those adjuvants and carriers with which there is no incompatibility.

In order that this invention may be readily available to and understood by those skilled in the art, the following nonlimiting examples for preparing the compounds thereof are appended.

EXAMPLE I

*1-(2-hydroxyethyl)-3-(5-nitrofurfurylideneamino)-2-imidazolidinone*

A. To 360 g. (3.46 moles) of 2-(2-aminoethylamino)ethanol is added 204 g. (3.3 moles) of urea in a 1 l. flask with an air condenser. The mixture is heated, and at 100° ammonia evolves. The temperature is gradually increased to 230° to maintain the evolution of ammonia for about 2¾ hours. The solution is allowed to cool overnight. The solid is melted and poured from the flask. On cooling the liquid solidifies to give 435 g. (100%) of 1-(2-hydroxyethyl)-2-imidazolidinone, M.P. 53.5–57.5°, which is used in the next step without purification.

B. To 362 g. (2.78 moles) of 1-(2-hydroxyethyl)-2-imidazolidinone dissolved in 7.625 l. of 10% sulfuric acid is added at 5° over 15 mins. 206 g. (3 moles) of sodium nitrite while maintaining the temperature at 5°. After stirring at 0–5° for 1¼ hours, 420 g. (6.45 moles) of zinc dust is added over 45 mins. at a temperature below 20°. The mixture is stirred for 1 hr. and filtered. To 1945 ml. (25%) of the filtrate is added a solution of 86 g. (0.61 mole) of 5-nitrofurfural dissolved in 600 ml. of ethanol. After cooling overnight the orange precipitate is filtered, rinsed with 50% ethanol and dried at 60°. The yield of title product is 152 g. (82%), M.P. 194–195°.

*Analysis.*—Calc. for $C_{10}H_{12}N_4O_5$: C, 44.78; H, 4.51; N, 20.89. Found: C, 44.86; H, 4.56; N, 20.88.

EXAMPLE II

*1-(2-chloroethyl)-3-(5-nitrofurfurylideneamino)-2-imidazolidinone*

To a 400 ml. of thionyl chloride is added in portions 152 g. (0.565 mole) of the compound of Example I. The clear solution is heated at reflux temperature for 30 mins., cooled in an ice bath and filtered. The solid is washed with benzene and the benzene washings are added to the reaction filtrate to give a second crop of solid. The total yield is 92 g. (57%), M.P. 184–185°. Recrystallization from a mixture of 4.25 l. of ethanol and 700 ml. of acetonitrile using charcoal gives 75 g. of title product, M.P. 195–196°.

*Analysis.*—Calc. for $C_{10}H_{11}ClN_4O_4$: C, 41.95; H, 3.87; N, 12.37. Found: C, 41.93; H, 3.80; N, 12.39.

Similar results are obtained when a bromonating agent is used.

Many modifications will be apparent to those skilled in the art from reading of the above without departing from the inventive concept.

What is claimed is:

1. The compound 1-(2-hydroxyethyl)-3-(5-nitrofurfurylideneamino)-2-imidazolidinone of the formula:

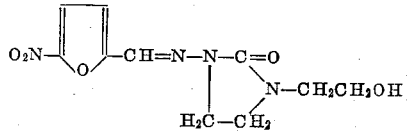

2. The compound 1-(2-chloroethyl)-3-(5-nitrofurfurylideneamino)-2-imidazolidinone of the formula:

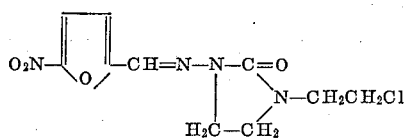

3. A compound of the formula:

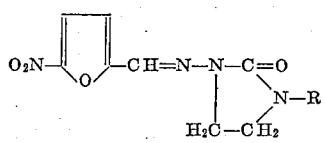

where R is a member of the group consisting of 2-hydroxyethyl and 2-haloethyl.

References Cited by the Examiner

UNITED STATES PATENTS

| 2,742,462 | 4/1956 | Gever | 260—240 |
| 2,746,960 | 5/1960 | Gever et al. | 260—240 |
| 2,920,074 | 1/1960 | Michels | 260—240 |
| 3,076,805 | 2/1963 | Michels | 260—240 |

FOREIGN PATENTS 217,462   10/1961   Austria.

OTHER REFERENCES

Conant et al.: The Chemistry of Organic Compounds, 3rd Ed., page 342, New York, MacMillan, 1947.

JOHN D. RANDOLPH, *Acting Primary Examiner.*

WALTER A. MODANCE, *Examiner.*

NATALIE TROUSOF, *Assistant Examiner.*